US012319471B2

(12) United States Patent
Chalfant et al.

(10) Patent No.: US 12,319,471 B2
(45) Date of Patent: Jun. 3, 2025

(54) GRIPPING ATTACHMENT FOR A BOTTLE

(71) Applicant: Eli Lilly and Company, Indianapolis, IN (US)

(72) Inventors: Tonya Lee Chalfant, Fishers, IN (US); Carrie Jannean Page, Sullivan, IN (US); Tony Y. Zhang, Fishers, IN (US); Robert Louis Ternik, Fishers, IN (US); Matthew Scott Thomas, Indianapolis, IN (US); Jacob Luisi, Indianapolis, IN (US); Michael P. Squillace, Indianapolis, IN (US)

(73) Assignee: ELI LILLY AND COMPANY, Indianapolis, IN (US)

( * ) Notice: Subject to any disclaimer, the term of this patent is extended or adjusted under 35 U.S.C. 154(b) by 113 days.

(21) Appl. No.: 17/993,489

(22) Filed: Nov. 23, 2022

(65) Prior Publication Data

US 2023/0079438 A1 Mar. 16, 2023

Related U.S. Application Data

(63) Continuation of application No. 16/963,541, filed as application No. PCT/US2019/017925 on Feb. 14, 2019, now Pat. No. 11,518,576.

(Continued)

(51) Int. Cl.

*B65D 23/08* (2006.01)
*A61J 1/14* (2023.01)

(Continued)

(52) U.S. Cl.

CPC ........ *B65D 23/0885* (2013.01); *A61J 1/1418* (2015.05); *B65D 23/106* (2013.01); *B65D 23/12* (2013.01)

(58) Field of Classification Search

CPC .. B65D 23/0885; B65D 23/106; B65D 23/12; B65D 2313/06; A61J 1/1418; A61M 5/008

(Continued)

(56) References Cited

U.S. PATENT DOCUMENTS 2,838,226 A 6/1958 Wilhelm et al.
3,013,691 A 12/1961 Prentice (Continued)

FOREIGN PATENT DOCUMENTS

CN 201604857 U 10/2010
CN 203372530 U 1/2014

(Continued)

OTHER PUBLICATIONS

JP Office Action, Notice of Reasons for Rejection, Sep. 9, 2021.

(Continued)

*Primary Examiner* — Ernesto A Grano
(74) *Attorney, Agent, or Firm* — M. Daniel Spillman

(57) ABSTRACT

A gripping attachment (10) is disclosed which facilitates the handling of a medication bottle (12). The medication bottle includes a container (14) having a cylindrical wall (16) extending parallel to a longitudinal axis. The container is closed at one end by a base wall (18) and has an opposed open end. The container receives a cap (20) on the open end to enclose the container. The gripping attachment comprises a sleeve portion (22) having a sleeve wall (24) defining an internal, cylindrical surface configured to removably attach to the container wall. The gripping attachment further comprises a leverage component connected to the sleeve portion to facilitate gripping the sleeve portion.

20 Claims, 8 Drawing Sheets

Related U.S. Application Data

(60) Provisional application No. 62/633,206, filed on Feb. 21, 2018.

(51) Int. Cl.
*B65D 23/10* (2006.01)
*B65D 23/12* (2006.01)

(58) Field of Classification Search
USPC .......................................................... 215/396
See application file for complete search history.

(56) References Cited

U.S. PATENT DOCUMENTS

| | | | | |
|---|---|---|---|---|
| 5,013,074 | A | 5/1991 | Galle | |
| 5,447,243 | A * | 9/1995 | Graber | B43M 99/008 211/13.1 |
| 5,809,674 | A | 9/1998 | Key | |
| 6,571,976 | B1 | 6/2003 | Sonnabend | |
| 7,337,915 | B1 | 3/2008 | Weldon | |
| D617,894 | S | 6/2010 | Wright | |
| 7,726,499 | B2 | 6/2010 | Williamson et al. | |
| 7,726,621 | B1 | 6/2010 | Dellinger | |
| 8,307,670 | B2 | 11/2012 | Stewart et al. | |
| D677,128 | S | 3/2013 | Roesser | |
| D678,731 | S | 3/2013 | O'Neill | |
| D679,553 | S | 4/2013 | Williams | |
| 8,448,810 | B2 | 5/2013 | Kelly et al. | |
| 8,544,678 | B1 | 10/2013 | Hughes | |
| 8,579,133 | B2 | 11/2013 | Marcus et al. | |
| 8,720,739 | B2 | 5/2014 | Bollis | |
| 9,851,476 | B2 | 12/2017 | Cole | |
| 10,792,227 | B2 | 10/2020 | Moran | |
| 11,155,385 | B2 | 10/2021 | Robertaccio | |
| 2001/0030271 | A1 | 10/2001 | Weesner et al. | |
| 2007/0012651 | A1 | 1/2007 | Williamson et al. | |
| 2008/0047967 | A1 | 2/2008 | Brunner et al. | |
| 2010/0224585 | A1 * | 9/2010 | Feeley | A61J 9/08 220/23.91 |
| 2010/0325904 | A1 | 12/2010 | West | |
| 2011/0204017 | A1 | 8/2011 | O'Sullivan | |
| 2012/0104010 | A1 | 5/2012 | Kelley | |
| 2016/0175197 | A1 | 6/2016 | Larson et al. | |

FOREIGN PATENT DOCUMENTS

| | | | |
|---|---|---|---|
| CN | 105287202 | A | 2/2016 |
| CN | 105686581 | A | 6/2016 |
| CN | 106490922 | A | 3/2017 |

OTHER PUBLICATIONS

CN Office Action, Text of First Office Action, Aug. 4, 2021.
International Searching Authority, International Search Report for PCT/US2019/017925.
International Searching Authority, Written Opinion for PCT/US2019/017925.

* cited by examiner

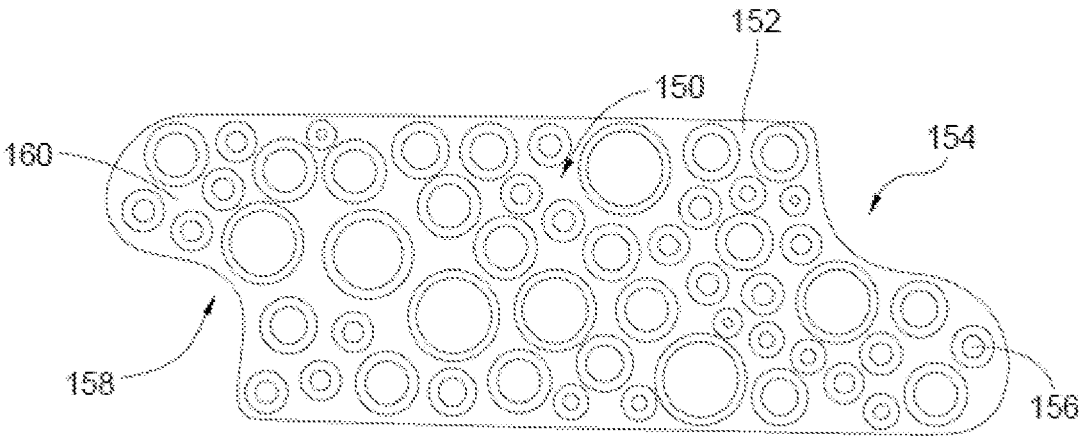
*Fig. 16*
*Fig. 17*
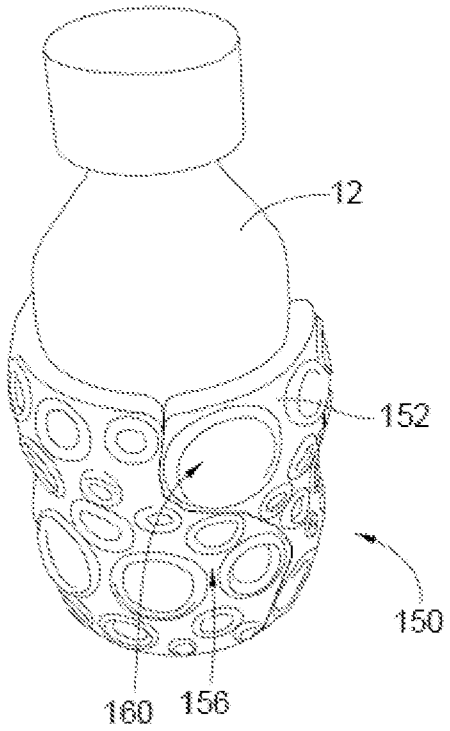

GRIPPING ATTACHMENT FOR A BOTTLE

BACKGROUND

Technical Field

The present disclosure relates to a gripping attachment to be secured to a medication bottle to facilitate handling of the bottle during use.

Background

Medications are frequently provided in a variety of types of bottles. These bottles include a container closed at one end by a removable cap. The containers may be made from glass, plastic, metal or other materials. The cap includes a mechanism for securement to the container, which may comprise a snap fit, a threaded connection, or the like. The attachment of the cap to the container is made to be sufficiently secure to avoid accidental removal of the cap. In some instances, the cap is attached to the container as a child-proof securement.

It can be difficult for persons to remove and/or reattach the cap to the medication container. Particularly with the child-resistant system, it can be hard to manipulate the cap relative to the container in removing and/or reattaching the cap. This is especially true for persons who have diminished physical strength or dexterity due to age or medical condition.

SUMMARY

A gripping attachment is provided which facilitates the application and removal of a cap relative to a medication container. The gripping attachment includes a sleeve portion having a cylindrical wall defining an internal, cylindrical surface configured to removably attach to the cylindrical wall of a medication bottle to inhibit relative rotation therebetween. The gripping attachment further includes a leverage component secured to the sleeve portion and facilitating handling of the medication container and cap. The gripping attachment can enhance attachment and removal of the cap, as well as aid in holding the container while dispensing or withdrawing a dose with accuracy and limited spilling.

BRIEF DESCRIPTION OF THE DRAWINGS

The features and advantages of the present disclosure will become more apparent to those skilled in the art upon consideration of the following detailed description taken in conjunction with the accompanying figures.

FIG. 16 is a top, plan view of a band useful as a gripping attachment for a medication bottle.

FIG. 17 is a perspective view of the band of FIG. 15 as applied to a medication bottle to function as a gripping attachment.

DETAILED DESCRIPTION

Figure 1:
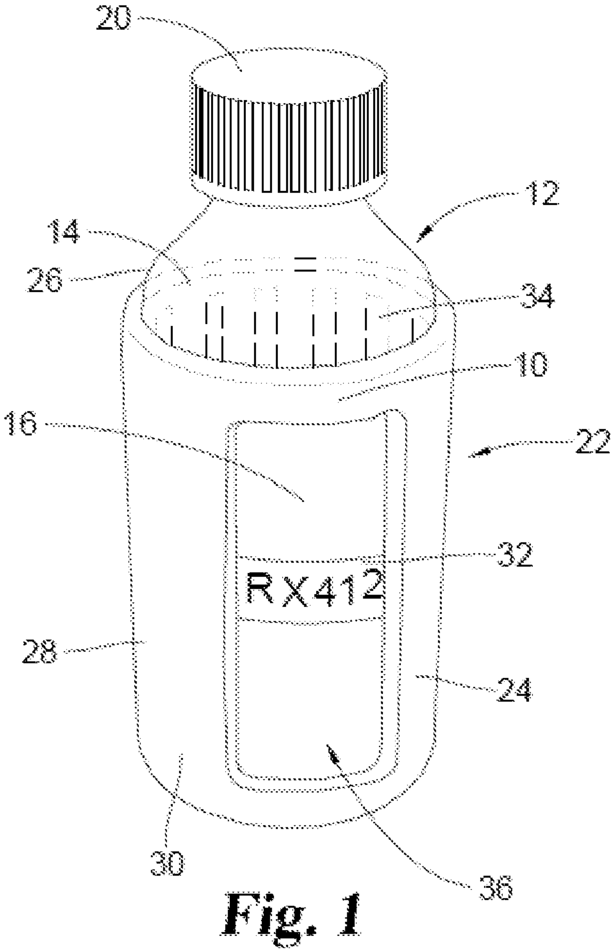
FIG. 1 is a perspective view of an embodiment of an illustrative gripping attachment secured to a medication bottle.

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended.

The gripping attachment of the present invention comprises a sleeve portion received over a medication container. The sleeve portion comprises a cylindrical wall that is configured to closely fit and adhere to the medication container. The gripping attachment also includes a leverage component to facilitate holding the container against relative rotation when a cap is applied to or removed from the container.

As used herein, the term "cylindrical" refers to a shape which closely conforms to the longitudinal walls of typical medication containers. Such a container generally has a uniform cross section for much of its length, and this cross section may have any geometric shape, including round, oval, rectangular (including square), hexagonal, etc. The sleeve portions of the gripping attachment may be pre-shaped to match the cross section of the medication container. Alternatively, the sleeve portion of the gripping attachment may comprise a pliant material which conforms to the walls of the medication container when applied thereover. In one aspect, the sleeve portion may comprise a flexible material which is stretched over the medication bottle. The sleeve portion desirably has an elastic, rubbery feel (touch friendly) which is pleasing to the user and functional for purposes of gripping.

A gripping attachment is provided which facilitates gripping a medication container during use. Referring to FIG. 1, there is shown a gripping attachment 10 secured to a medication bottle 12. Bottle 12 includes a container 14 having a cylindrical container wall 16 closed at one end by a base wall 18 (FIG. 3), and open at the other end. Container 14 includes external threads (not shown) adjacent the open end and receives an internally threaded cap 20 to enclose container 14. The threaded cap 20 may be configured for normal manipulation, or may be of the "child-resistant" type requiring special effort, such as axial pressing, to release the threaded connection. The cap may alternatively be secured to the container by other closure systems, such as through a press or snap fit.

Gripping attachment 10 comprises a sleeve portion 22 having a cylindrical wall 24 when attached to the medication bottle. Cylindrical sleeve wall 24 defines an internal surface configured to closely conform with and firmly attach to exterior wall surface 26 of container 14. Gripping attachment 10 is provided with a leverage component to facilitate holding container 14 during application or removal of the cap to the container, as well as at other times.

In an exemplary embodiment, leverage component 28 is provided as a surface on the sleeve portion comprising a high-friction material 30, which may even be provided with a slightly "tacky" feel. Suitable materials for this purpose include, for example, neoprene, SCUBA foam rubber, open or closed cell polyurethanes, and other urethane combinations with durometers of about 30 to about 70. The material may come in a variety of colors and optionally may be covered in a fabric material.

Medication bottles typically contain a label providing important information regarding the nature and dosing requirements for the contained medication. Accordingly, the gripping attachment is provided with viewing portions in strategically placed positions to allow viewing of the label. The viewing portions may comprise a transparent material or an opening formed as an absence of material for that portion of the sleeve portion of the gripping attachment. The viewing portions thereby provide visibility to the underlying medication label. Additionally, the viewing portions allow the user to see how much medication is remaining in the medication container.

Referring to FIG. 1, gripping attachment 10 includes one or more narrow, vertical openings 34, visible through bottle 12 in FIG. 1. These provide visibility for substantially all of the height of the medication container encompassed by the gripping attachment. In addition, gripping attachment 10 includes a relatively large viewing portion 36 which allows viewing of at least portions of medication label 32. Viewing portion 36 is sized to allow viewing of key portions of medication label 32, and may allow access to all information provided on the medication label.

Gripping attachment 10 is configured to be readily attached to container 14 of medication bottle 12. Sleeve portion 22 includes an interior surface 38 (FIG. 3) which in use is positioned against the exterior wall surface 26 of container 14. Interior surface 38 is configured to provide a frictional engagement of exterior wall surface 26 sufficient for use as herein described. For this purpose, interior surface 38 may be formed of or provided with a high friction surface. In some embodiments, a separate coating is applied to interior surface 38. However, the amount of frictional engagement between interior surface 38 and exterior wall surface 26 is limited so as to allow for attachment of sleeve 22 without undue damage to a medication label present on the bottle, and also to allow for removal from the container for subsequent use on other medication containers.

The engagement of sleeve 22 with exterior wall surface 26 will be enhanced by the fact that the user naturally presses sleeve 22 against exterior wall surface 26 in holding the gripping attachment in normal use. Therefore, it is sufficient that the frictional engagement of sleeve 22 with container 14 is in an amount that relative rotation between the gripping attachment and container is prevented while the user holds the gripping attachment during attachment and/or removal of the cap. At the same time, the frictional engagement, in the absence of direct gripping of sleeve portion 22, may be sufficiently reduced that sleeve portion 22 may be attached to and removed from container 14 without undue effort or damage to the medication label.

Figure 2:
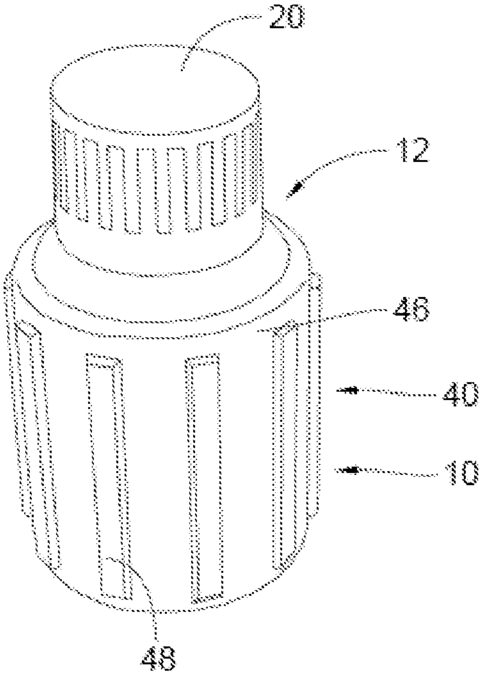
FIG. 2 is a perspective view of an alternative gripping attachment attached to a medication bottle and having vertical ribs.
Figure 3:
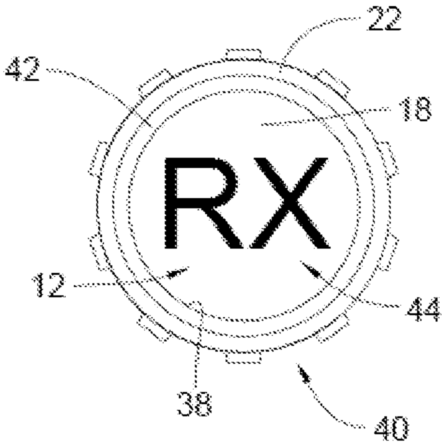
FIG. 3 is a bottom plan view of the gripping attachment of FIG. 2.

Surface features of the gripping attachment facilitate placement of the gripping attachment onto the medication container, as well as firm gripping of the outer surface of the gripping attachment during use. These surface features also facilitate manipulating the gripping attachment when it is to be separated from the medication container. In an exemplary embodiment, the gripping attachment includes a bottom opening which exposes the bottom surface of the medication container. By way of example, FIGS. 2 and 3 depict an alternative form of the gripping attachment. FIG. 3 provide a bottom view of gripping attachment 40. Gripping attachment 40 includes a bottom wall 42 (FIG. 3) defining a central aperture 44. In use, container 14 is pushed down into sleeve portion 22 of gripping attachment 40 until it rests adjacent the upper surface of bottom wall 42. To remove gripping attachment 40 from container 14, the user holds the sleeve portion 22 and presses against the base wall 18 to force container 14 upward relative to sleeve portion 22.

Leverage component 28 may alternatively comprise various other surface features providing enhanced gripping. By way of further example, gripping attachment 40 is shown in FIG. 3 as including sleeve portion 46 including spaced, vertical ribs 48. Ribs 48 are sized, shaped and spaced for providing useful gripping points as the user rotates cap 20 relative to container 14 in order to apply or remove cap 20. Ribs 48 preferably provide a comfortable feel for the user. Ribs 48 thus may be formed of relatively soft material having rounded edges. In the alternative or in addition, ribs 48 may extend horizontally or at an angle, or as a combination of different orientations. The surface features may also comprise texturing of the surface.

Figure 4:
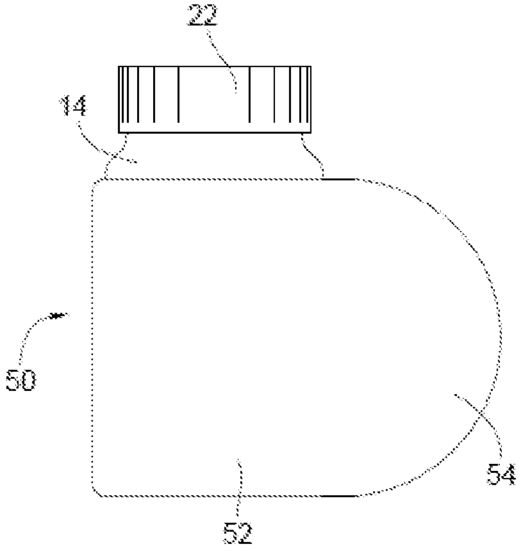
FIG. 4 is a side, elevational view of an embodiment of a gripping attachment on a medication bottle and including an outwardly extending knob.
Figure 5:
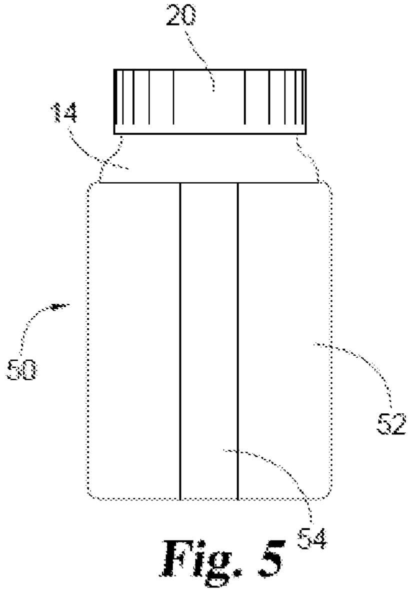
FIG. 5 is a front, elevational view of the gripping attachment of FIG. 4.
Figure 6:
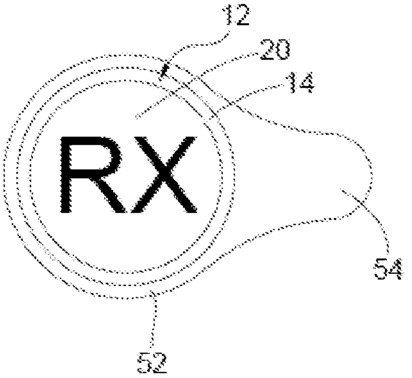
FIG. 6 is a top, plan view of the gripping attachment of FIG. 4.

Shown in FIGS. 4-6 is an example of a leverage component 28 comprising a knob extending outwardly of the gripping attachment. Gripping attachment 50 includes a sleeve portion 52 attached to container 14 as previously described. Gripping attachment 50 further includes a knob 54 which extends outwardly of sleeve portion 52, and preferably along a longitudinal direction relative to container 14. In use, the user grips sleeve 52 and knob 54 in order to hold container 14 in a fixed rotational position while a cap is being attached to or removed from the container.

Figure 7:
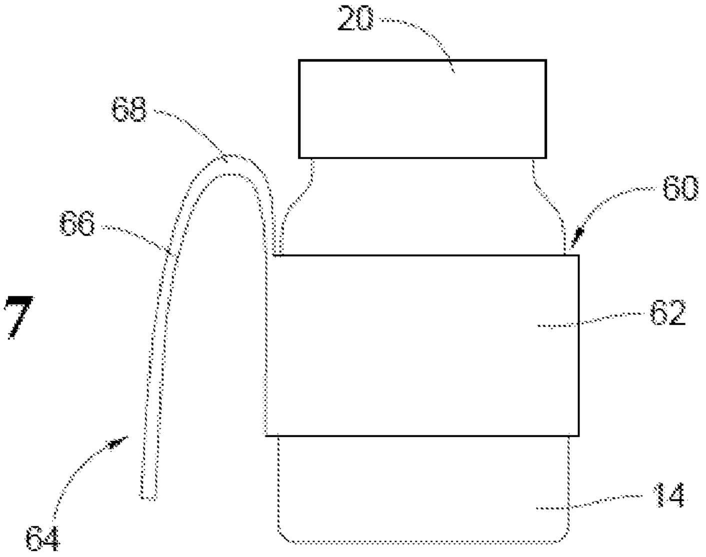
FIG. 7 is a side, elevational view of a gripping attachment secured to a medication bottle and including a handle.
Figure 8:
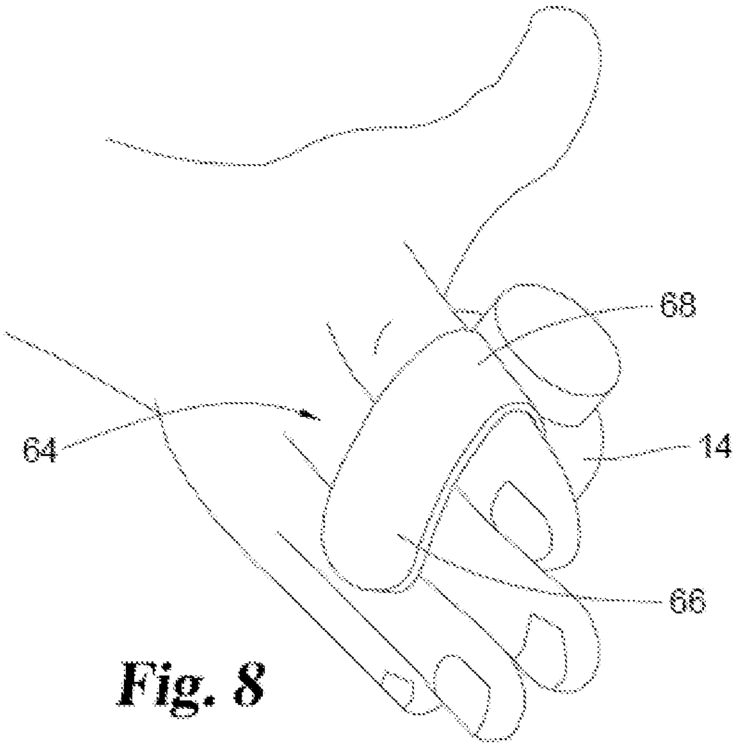
FIG. 8 is a perspective view of the gripping attachment of FIG. 7 being held by a user.

An alternate exemplary embodiment is shown in FIGS. 7-8. Gripping attachment 60 includes a sleeve portion 62 affixed to medication container 14 in use. Gripping attachment 60 further includes a handle member 64 attached to sleeve portion 62. Handle member 64 includes an upright portion 66 extending substantially parallel to sleeve portion 62. Upright portion 66 is attached in one embodiment, shown in FIG. 7, by an upper connecting member 68 attached to sleeve portion 62 adjacent an upper end of sleeve portion 62. Handle member 64 thus includes a portion extending from the sleeve wall in a direction generally perpendicular to the longitudinal axis of the container, and a portion extending from the first portion in a direction parallel to the sleeve wall. Thus, handle member 64 has a portion located adjacent the open end of the container and a portion terminating at a point spaced from the sleeve wall.

In alternative embodiments, upright portion 66 may be attached to sleeve portion 62 by a lower connecting member attached to sleeve portion 62 adjacent a lower end of the sleeve portion. The handle may also be attached to the sleeve portion by both upper and lower connection portions. In the latter case, the handle member has a portion connecting the upright portion adjacent to the open end of the container, and a portion connecting the upright portion at a point lower on the sleeve wall.

As shown in FIG. 8, handle member 64 is desirably configured to receive one or more fingers of the user to facilitate gripping sleeve portion 62 against container 14. This enhances the ability of the user to resist rotation of gripping attachment 60 and medication container 14 relative to cap 20 during attachment or removal of the cap.

Figure 9:
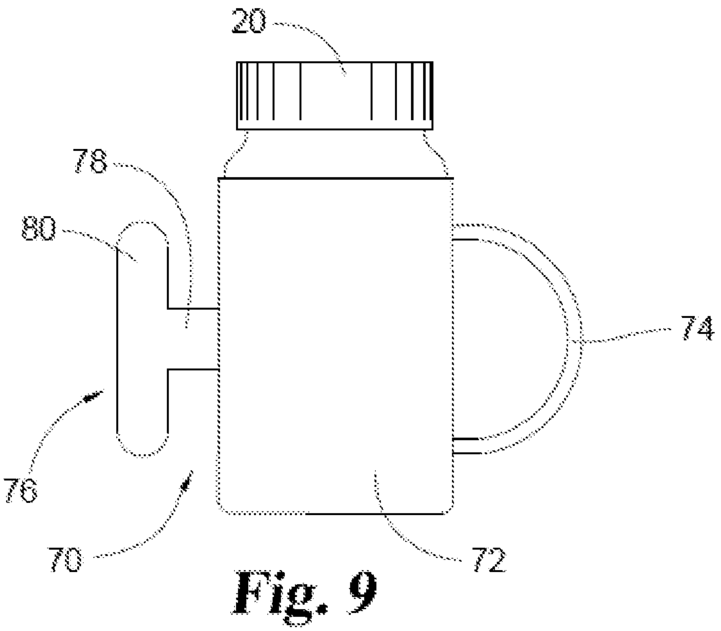
FIG. 9 is a side, elevational view of a gripping attachment having an alternate handle configuration.

Referring to FIG. 9, there is shown yet another embodiment of a gripping attachment as contemplated herein. Gripping attachment 70 includes a sleeve portion 72 secured to container 14. Attached to sleeve portion 72 is a thumb handle 74. Thumb handle 74 is similar to handle member 64 of FIGS. 7-8, but is sized instead to receive a user's thumb. Thumb handle 74 may be provided alone on sleeve portion 72. In an alternate embodiment, however, a finger grip 76 is also provided. Finger grip 76 comprises a strut 78 extending radially outward of sleeve portion 72, and a finger support 80 attached to and extending above and below strut 78. The user grasps medication bottle 12 by placing the thumb into thumb handle 74, and by placing fingers under finger support 80 on either side of strut 78. As for other designs described herein, this configuration allows the user to grip sleeve portion 72 against container 14 and to resist rotation of gripping attachment 70 and medication container 14 relative to cap 20 during attachment or removal of cap 20.

Figure 10:
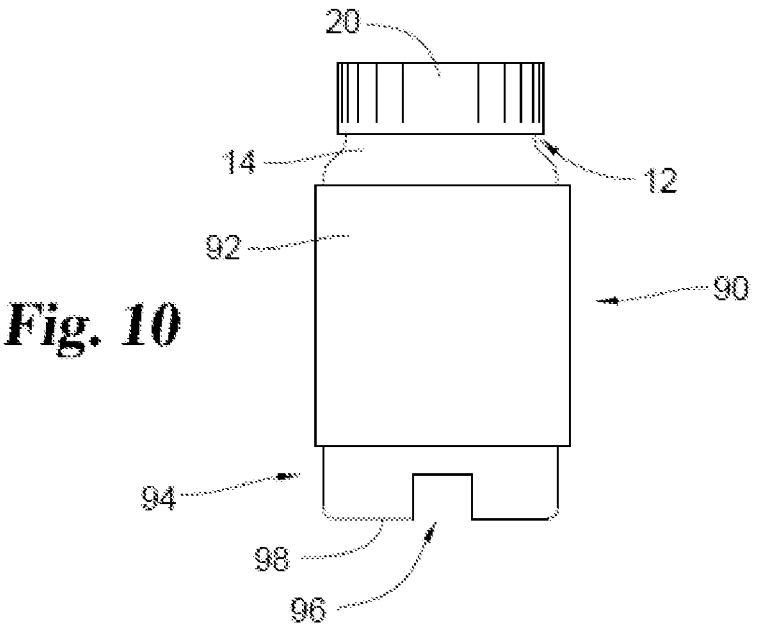
FIG. 10 is a side, elevational view of a gripping attachment including a groove in a base portion.

In yet another illustrative embodiment, gripping attachment 90 includes a sleeve portion 92 secured to medication container 14 during use, as shown in FIG. 10. Gripping attachment 90 includes a bottom wall 94 extending downwardly from medication bottle 12. A transverse groove 96 is formed diametrically across the bottom surface 98 of bottom wall 94. A user may then grip sleeve portion 92 in a manner to extend a finger within groove 98 to further stabilize container 14 and resist rotation.

Figure 11:
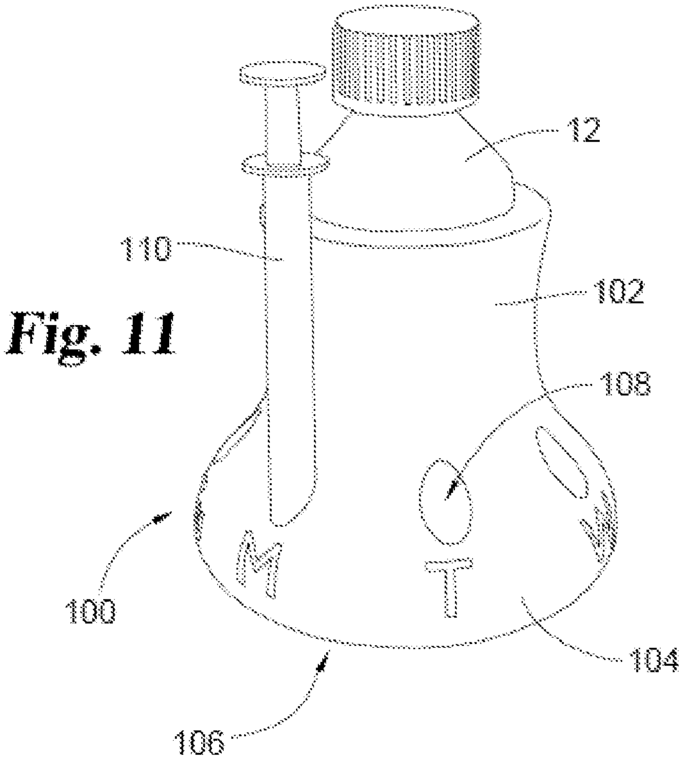
FIG. 11 is a perspective view of a gripping attachment including an enlarged base having cavities for receiving a syringe.

An alternative gripping attachment 100 is shown in FIG. 11 as including a sleeve portion 102 and a base 104. Base 104 is radially-enlarged in comparison to sleeve portion 102 and container 14, such that gripping attachment 100 includes a portion similar in diameter to the outer surface of the medication container and a portion extending more distant from the outer surface. This provides a larger bottom surface 106 for supporting bottle 12, and thus enhances the stability of medication bottle 12 when placed on a supporting surface.

An optional feature is the provision of a surface structure in the gripping attachment for containing a syringe, typically an oral dosing syringe. The surface structures may be provided to correlate with the dosing regimen for the medication. As shown in FIG. 11, for example, base 104 may be provided with one or more cavities 108 in the enlarged base 104. In one embodiment, base 104 is provided with seven cavities corresponding to the days of the week. The cavities may be labeled to indicate each week day, and a syringe 110 may be placed in the day of the week corresponding to usage of the syringe. For example, the syringe may be placed in the labeled cavity corresponding to the day on which the syringe is to be used next.

Figure 12:
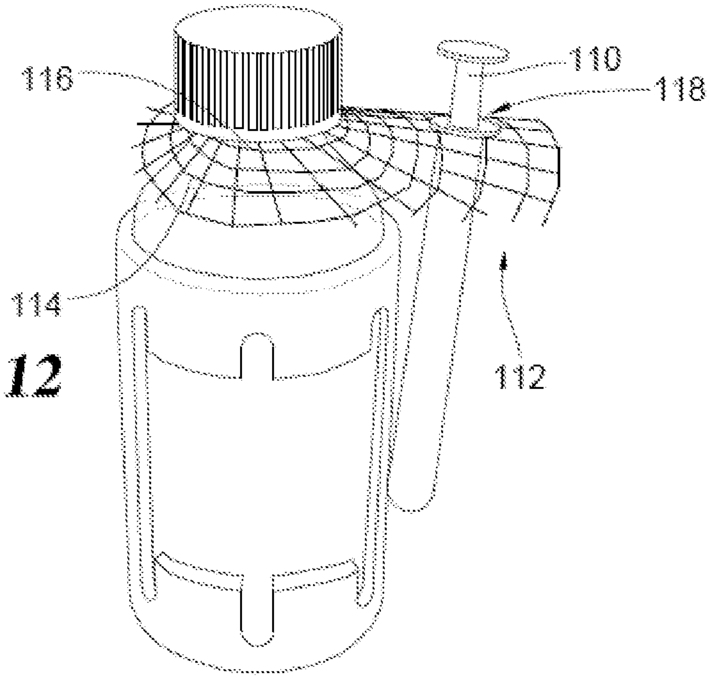
FIG. 12 is a perspective view of a coupling member securing a syringe a medication container.

Alternatively, the gripping attachment may be used in combination with a separate syringe attachment. As shown in FIG. 12, a coupling member 112 includes a leep 114 received over the neck 116 of container 14. Coupling member 112 further includes an opening 118 securing the syringe to the container.

Figure 13:
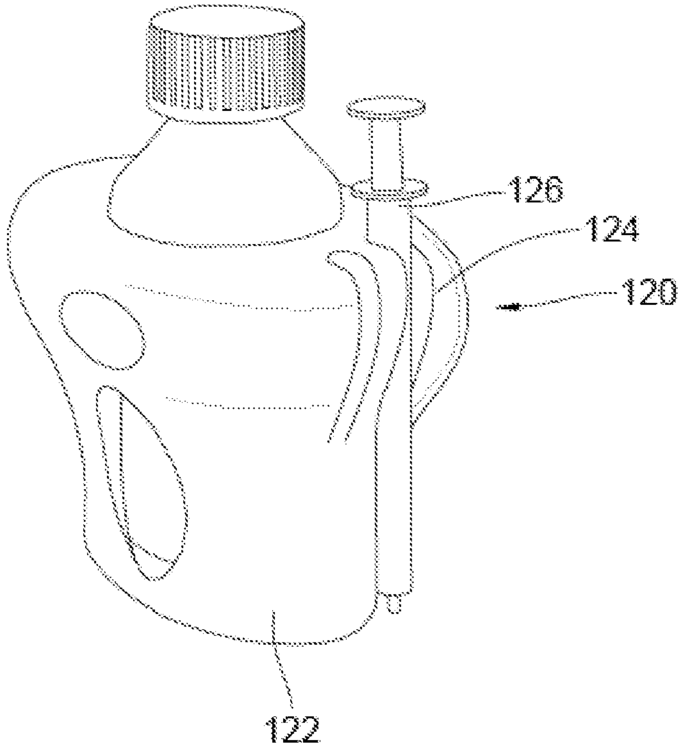
FIG. 13 is a perspective view of a gripping attachment including an enlarged upper portion and a notch for holding a syringe.

Another design for the gripping attachment is shown in FIG. 13. Gripping attachment 120 includes an enlarged base portion 122, and an even more enlarged upper portion 124. A notch 126 is formed in the upper portion 124 for receiving a syringe 128.

Figure 14:
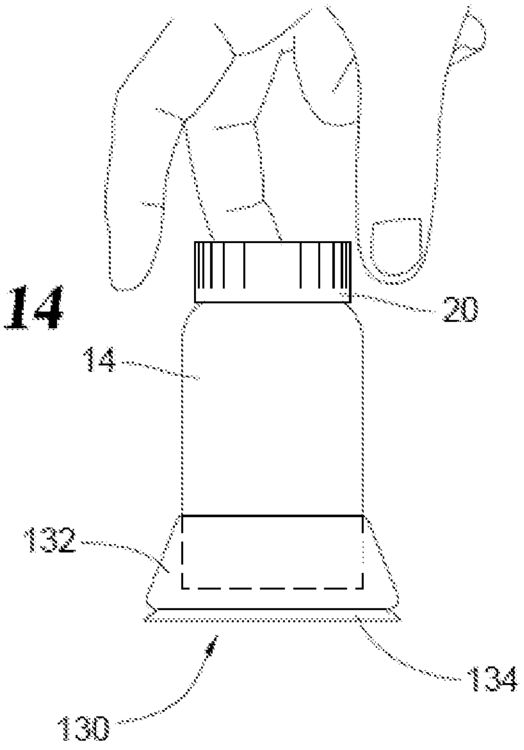
FIG. 14 is a side, elevational view showing a gripping attachment including an enlarged base including a suction cup.

The gripping attachment may also be configured to enhance resisting rotation of the gripping attachment relative to a supporting surface. In one aspect, the gripping attachment may be provided with a high-friction material which contacts the supporting surface. In another aspect, gripping attachment 130 (FIG. 14) includes a sleeve portion 132 receiving container 14. A suction cup 134 is provided at the bottom of gripping attachment 130 and is useable to engage a supporting surface.

Figure 15:
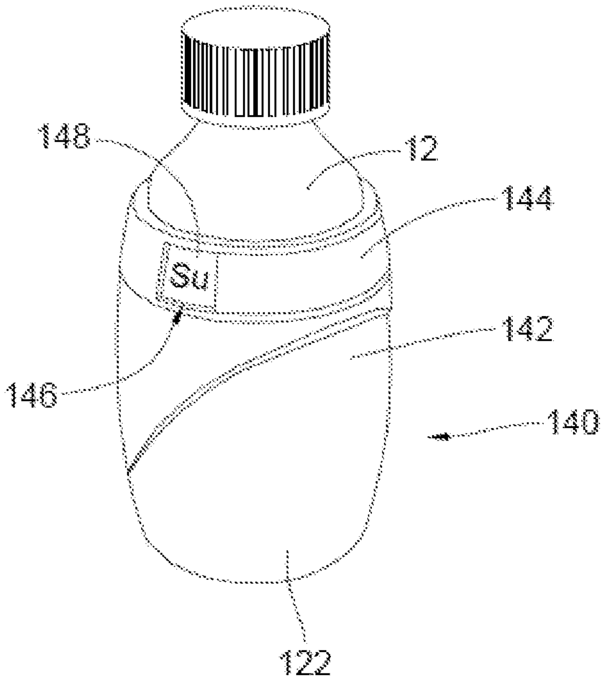
FIG. 15 is a perspective view of a gripping attachment having a slider for selecting a day of the week identifier.

An alternative method of tracking information using the gripping attachment is shown in FIG. 15. Gripping apparatus 140 comprises a sleeve portion 142 form fitted to bottle 12. A slider 144 is received within a window 146 and is movable to various radial positions. Identifications 148, such as for days of the week, are provided within window 146. The user moves slider 144 to different positions within window 146 to indicate desired identifications 148 listed in the window. For example, the slider may be moved to indicate the next day of the week when the medication is to be administered.

While daily dosing has been described, other dosing regimens may be tracked as well. These may include, for example, dosing multiple times per day, once per week, or any other prescribed schedule.

An alternative method of securement of the gripping attachment is shown in FIG. 16. Gripping attachment 150 comprises a band of material 152. Band 152 is formed, for example, by a metal or plastic that is spring biased to form a cylindrical shape sized to firmly hold against a medication container. Band 152 may have a non-attached condition in which it is in the form of a cylinder which may be opened by flexing the band outwardly of the cylinder. Band 152 need only then be opened a limited distance sufficient to insert the bottle into the enlarged band, at which time band 152 is allowed to close inwardly against the bottle.

In an alternative approach, band 152 may have a stable condition in which it is in essentially a flat form, as shown in FIG. 16. However, the band also has a condition in which the band springs into a cylindrical shape. Band 152 is applied to a medication bottle by placing the flattened band against the bottle and then urging the ends inward, which triggers band 152 into the cylindrical shape around the bottle.

In either embodiment, band 152 is sized to fit firmly around the medication bottle and thereby form a sleeve portion which functions in the same manner as other sleeve portions disclosed herein. Further, band 152 may be provided with any of the variety of leverage components as previously described. Use of the band may make it easier to apply the gripping attachment to a medication bottle, and also to remove it therefrom. It may also be less likely to damage a label present on the bottle.

In one aspect, the ends of band 152 are shaped to form an interlock when received around a bottle. For example, as shown in FIG. 16, band 152 has a first end 154 having a projecting portion 156 along one side of the band, and a second end 158 having a projecting portion 160 along the other side of the band. As shown in FIG. 17, band 152 is sized such that projecting portion 156 is received closely adjacent projecting portion 160 when secured to medication bottle 12.

The gripping attachment may include markings in order to provide auxiliary information pertaining to the medication and/or use of the attachment. For example, the gripping attachment may include a designation to "Shake Before Using" or to "Keep Refrigerated". The markings may alternatively instruct how to properly remove the gripping attachment, such as by "To Remove, Press Upwardly Through Bottom Opening".

The gripping attachment may be formed from any materials providing the identified characteristics. The gripping attachment is preferably reusable, and to that end the sleeve portion is configured for easy attachment, removal, and reattachment. The gripping attachment is preferably formed from material that is a durable material which is readily cleaned.

Use of the gripping attachment provides numerous advantages in addition to use while applying or removing a cap. The gripping attachment is useful to enhance the user's ability to access the contents of the medication container, such as dispensing or withdrawing the medication. The greater control of the container provided by the gripping attachment also can enhance accuracy and reduce spilling. In certain embodiments, the gripping attach reduces reduce the likelihood that the medication bottle will tip. The potential for damage to the medication bottle and loss of its contents are reduced. Other advantages are also achieved in view of the added stability of the medication bottle both during use and when resting on a supporting surface.

The invention claimed is:

1. A gripping attachment device to facilitate handling a medication bottle, said gripping attachment device comprising:

a medication bottle including a container having a cylindrical wall extending parallel to a longitudinal axis, the container being closed at one end by a base wall and having an opposed open end, the container receiving a cap on the open end to enclose the container;

a sleeve portion having a sleeve wall defining an internal, cylindrical surface removably attached to the container wall to inhibit relative movement therebetween, said sleeve portion including an enlarged base and a surface structure for receiving a syringe, in which the surface structure comprises a notch configured to receive a syringe; and a leverage component connected to said sleeve portion and configured to facilitate holding the container against relative rotation when the cap is applied to or removed from the container when said sleeve portion is attached to the container wall.

2. The device of claim 1 in which said leverage component comprises the sleeve wall having a tacky outer surface.

3. The device of claim 1 in which the sleeve wall comprises an outer surface, said leverage component comprising surface features projecting from the outer surface away from the sleeve wall.

4. The device of claim 1 in which the sleeve wall comprises an outer surface and said leverage component comprises a knob extending outwardly from the outer surface.

5. The device of claim 1 in which the sleeve wall comprises an outer surface and said leverage component comprises a handle extending outwardly from the outer surface.

6. The device of claim 1 in which said sleeve portion includes a bottom wall at least partially covering the base wall when received upon a container.

7. The device of claim 6 in which the bottom wall includes a central opening enabling contact of the base wall of the container through the opening.

8. The device of claim 6 in which the bottom wall of said sleeve portion includes a groove.

9. The device of claim 1 in which sleeve portion has a diameter similar in diameter to the outer surface of the medication container, and the enlarged base is a radially-enlarged base that extends more distant from the outer surface of the medication container.

10. The device of claim 1 in which the enlarged base includes a bottom surface configured to resist rotation relative to the supporting surface.

11. The device of claim 1 further including a cavity for containing a syringe.

12. The device of claim 11 in which said enlarged base comprises the surface structure.

13. The device of claim 12 in which the surface structure comprises a cavity configured to receive a syringe.

14. The device of claim 12 including surface structures which correlate with the dosing regimen of the medication.

15. The device of claim 1 in which said sleeve portion includes a viewing portion configured to permit viewing of a portion of the container.

16. A method of using a gripping attachment device with a medication bottle, the medication bottle including a container having a cylindrical wall extending parallel to a longitudinal axis, the container being closed at one end by a base wall and having an opposed open end, the container receiving a cap on the open end to enclose the container, the gripping attachment device including a sleeve portion having a sleeve wall defining an internal cylindrical surface, said sleeve portion including an enlarged base and a surface structure for receiving a syringe, and a leverage component connected to said sleeve portion to facilitate gripping said sleeve portion, the method comprising the steps of:

inserting the mediation bottle into the gripping attachment device such that the internal cylindrical surface is attached to the container wall to inhibit relative movement therebetween; and inserting the syringe into the surface structure of the gripping attachment device.

17. The method of claim 16, in which the gripping attachment device comprises a dosing regimen indicator having a plurality of identifications, the method comprising the step of removing the syringe from the surface structure for a dosing event, and changing the identification of the plurality of identifications of the dosing regimen indicator.

18. A gripping attachment device to facilitate handling a medication bottle, the medication bottle including a container having a cylindrical wall extending parallel to a longitudinal axis, the container being closed at one end by a base wall and having an opposed open end, the container receiving a cap on the open end to enclose the container, said gripping attachment device comprising:

a sleeve portion having a sleeve wall defining an internal, cylindrical surface configured to removably attach to the container wall to inhibit relative movement therebetween, said sleeve portion including a radially-enlarged base and a surface structure for receiving a syringe, in which the surface structure comprises a notch configured to receive a syringe; and a leverage component connected to said sleeve portion to facilitate gripping said sleeve portion, in which said sleeve portion includes a radially-enlarged upper portion extending out more distant that the radially-enlarged base.

19. The device of claim 18 in which the notch is formed in the radially-enlarged upper portion.

20. The device of claim 18 in which said sleeve portion includes a viewing portion configured to permit viewing of a portion of the container.

* * * * *